US011979946B2

United States Patent
Mangalvedkar et al.

(10) Patent No.: US 11,979,946 B2
(45) Date of Patent: May 7, 2024

(54) SHAREABLE TRANSIENT IoT GATEWAYS

(71) Applicant: International Business Machines Corporation, Armonk, NY (US)

(72) Inventors: Amit Mohan Mangalvedkar, Bangalore (IN); Shalini Kapoor, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 16/245,000

(22) Filed: Jan. 10, 2019

(65) Prior Publication Data
US 2020/0229272 A1 Jul. 16, 2020

(51) Int. Cl.
*H04W 88/16* (2009.01)
*G06Q 40/04* (2012.01)
*H04L 12/66* (2006.01)
*H04L 67/562* (2022.01)
*H04W 4/70* (2018.01)
*H04W 72/044* (2023.01)

(52) U.S. Cl.
CPC ............ *H04W 88/16* (2013.01); *G06Q 40/04* (2013.01); *H04L 12/66* (2013.01); *H04L 67/562* (2022.05); *H04W 4/70* (2018.02); *H04W 72/044* (2013.01)

(58) Field of Classification Search
CPC .................................................. H04W 88/16
USPC ........................................................ 370/401
See application file for complete search history.

(56) References Cited

U.S. PATENT DOCUMENTS

| 6,795,443 | B1 | 9/2004 | Jeong et al. | |
|---|---|---|---|---|
| 7,599,692 | B2 | 10/2009 | Ooki et al. | |
| 2011/0002328 | A1* | 1/2011 | Hansen | H04Q 11/0457 370/352 |
| 2016/0088049 | A1* | 3/2016 | Seed | H04W 4/70 709/203 |
| 2016/0128043 | A1 | 5/2016 | Shuman et al. | |
| 2017/0237814 | A1* | 8/2017 | Zhang | H04W 76/14 709/201 |
| 2018/0020432 | A1* | 1/2018 | Rico Alvarino | H04W 8/22 |
| 2018/0054327 | A1 | 2/2018 | Ameling | |
| 2018/0198641 | A1* | 7/2018 | Gilani | H04L 63/1425 |
| 2019/0208024 | A1* | 7/2019 | Jablonski | G06Q 20/308 |
| 2019/0349426 | A1* | 11/2019 | Smith | H04L 67/104 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Christopher M Crutchfield
*Assistant Examiner* — Jean F Voltaire
(74) *Attorney, Agent, or Firm* — Anthony Curro

(57) ABSTRACT

A system and a method for a transient gateway, including a storage device storing a set of data, and a gateway engine coupled to the storage device accessing and updating the set of data, the gateway engine configured to share bandwidth and resources, across a plurality of organizations. The transient gateway organizes the set of data to act as a broker amongst the plurality of organizations. The transient gateway is configured to provide resources as a monetized commodity. The transient gateway provides protocols handling capabilities of its connected devices of one organization to another organization from among the plurality of organizations.

19 Claims, 10 Drawing Sheets

US 11,979,946 B2

SHAREABLE TRANSIENT IoT GATEWAYS

BACKGROUND

The disclosed invention relates generally to an embodiment of gateways, and more particularly, but not by way of limitation, relating to system and method of developing shareable transient IoT Gateways.

IoT (Internet of Things) Gateways connect IoT devices to the IoT Cloud, as the devices themselves are either incapable of connecting over TCP (Transmission Control Protocol) or have low computational power to send it across to the Internet, resulting in latency or lower throughput. These are dedicated hardware systems for particular organizations, even though not all organizations would need dedicated gateways running 24 hours a day, 7 days a week.

Another disadvantage with this prevalence of dedicated IoT Gateways is it causes exhaustion of IP Addresses. Also, if a gateway gets connected to too many devices and have a higher than maximum allowable flow rate, the gateway may not be able to maintain a certain assured throughput. It is equally possible that some of the devices to which an IoT Gateway is connected to, might have an ability to connect to IoT Cloud, albeit with a slightly lower throughput. Thus, these devices could act as secondary or tertiary gateways, even though their processing power may be less.

Similarly, sometimes the IoT Gateway might be incapable of communicating with the devices as it does not have the transceiver to communicate over the M2M (Machine to Machine) protocol, which some of the connected devices might have.

Thus, there is a need to provide a gateway that avoids the above problems.

SUMMARY

In view of the foregoing and other problems, disadvantages, and drawbacks of the aforementioned background art, an exemplary aspect of the disclosed invention provides a system and method of developing shareable transient IoT Gateways.

One aspect of the present invention is to provide a transient gateway, including a storage device storing a set of data, and a gateway engine coupled to the storage device accessing and updating the set of data, the gateway engine configured to share bandwidth and resources, across a plurality of organizations.

Another aspect of the present invention provides a method of a transient gateway, the method including storing a set of data, accessing and updating the set of data to share bandwidth and resources, across a plurality of organizations.

Another example aspect of the disclosed invention is to provide a computer program product including a computer readable storage medium having program instructions embodied therewith, the program instructions readable and executable by a computer to cause the computer to perform a method, including a memory, a processor coupled to the memory, the processor configured to perform the method including storing a set of data, accessing and updating the set of data to share bandwidth and resources, across a plurality of organizations.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

Example aspects of the invention will be better understood from the following detailed description of the exemplary embodiments of the invention with reference to the drawings.

DETAILED DESCRIPTION OF PREFERRED EMBODIMENTS

Figure 1:
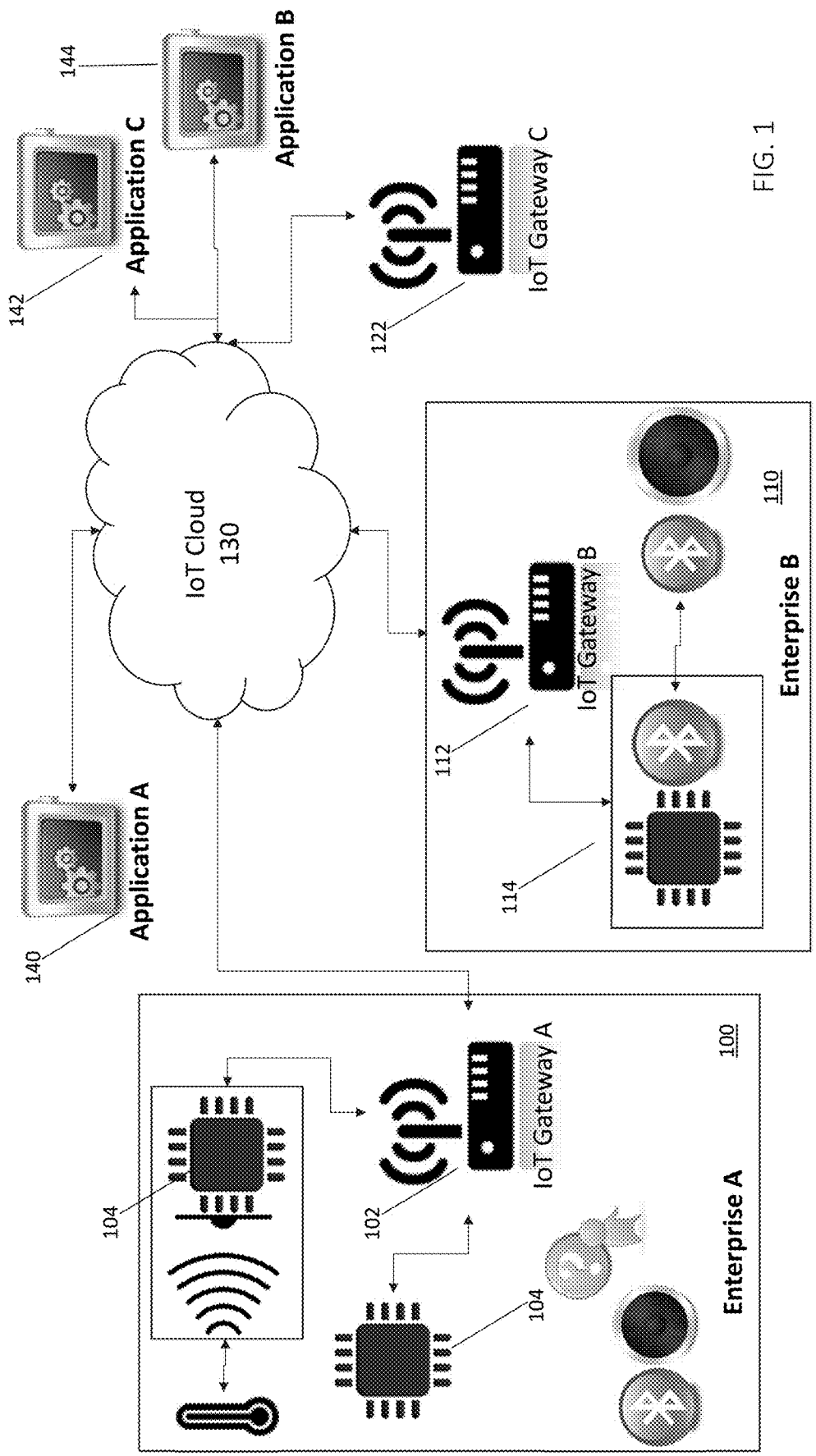
FIG. 1 illustrates an example IoT platform.

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

The disclosure proposes transient gateways which would solve the problems stated above, in the following manner. The transient gateway gets instantiated whenever the throughput needed at one location exceeds the maximum possible throughput that could be achieved at that location while still maintaining it below the maximum assured one. Thus, it attempts to provide a certain minimal assured throughput.

The transient gateway is a 'shared' gateway across various organizations and every device which need to make use of it, would need to pay, in the form of cryptocurrency (or other modes of payment). In case more organizations are interested in making use of the gateway, then the bandwidth would be 'auctioned' and made available to the 'highest bidding' device. Thus, the transient gateway solves the problem of under and over utilization of gateway.

The transient gateway maintains a registry of devices which can communicate over M2M protocols which it (the gateway), on its own, is incapable of communicating. Whenever any new device is connected to the gateway, the registry gets updated with the protocols and devices list. The transient gateway grants this device a status of secondary transient gateway and makes use of this new transient gateway for communicating over the protocols which it, on its own, is incapable of communicating.

It is possible that many of the organizations using the transient gateway, may need to communicate over the protocols that are supported by the secondary transient gateway, but may not 'own' such a communicating device at that location. In such a scenario, the transient gateway acts as a broker between these different organizations and facilitates monetary exchange.

Referring to FIG. 1, in the existing IoT scenario, there are dedicated organization specific IoT Gateways 102, 112, 122 communicating with various IoT devices 104, 114.

These dedicated gateways 102, 112, 122 have a number of limitations. Every enterprise 100, 110 needs to maintain a dedicated (for every organization) gateway 102, 112, although multiple organization IoT devices 104, 114 could be co-located. Although IoT Gateways 102, 112, 122 may not be needed 24×7 (24 hours and 7 days a week), however, due to the unpredictable nature of IoT events, the organizations need to keep it up and running always.

Some gateways 102, 112, 122 may not have capabilities to interact over the protocols needed for communication with the devices 104, 114 present in the same location, although other gateway, co-located in the same area but belonging to another organization, may have the capability. The IoT Gateways 102, 112, 122 are connected through the IoT cloud 130 with a plurality of applications 140, 142, 144.

Figure 2:
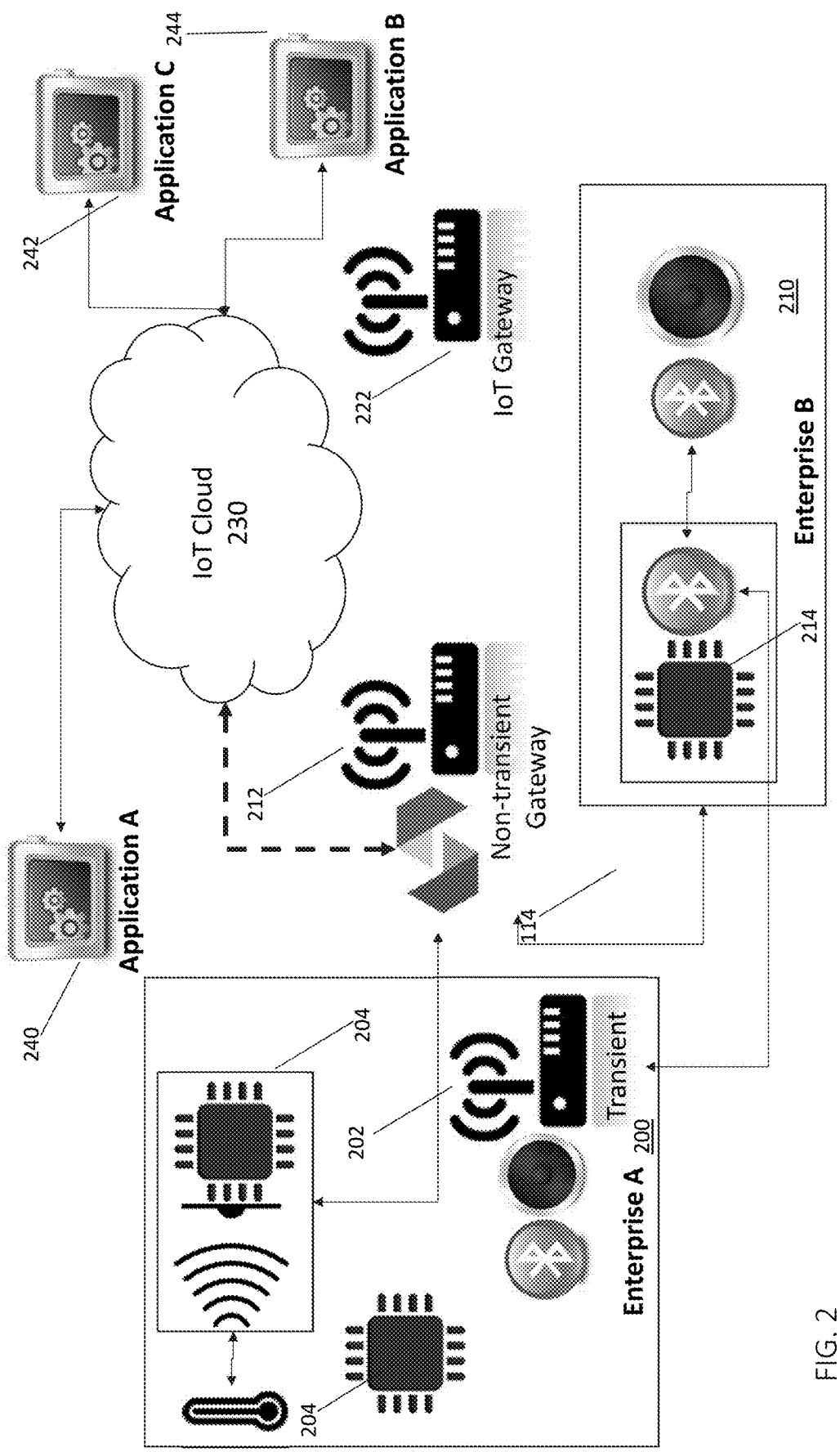
FIG. 2 is an illustration of one embodiment of an example transient IoT Gateway.

FIG. 2 is an illustration of a transient IoT Gateway of an exemplary embodiment to mitigate the above mentioned and other issues.

As can be seen from FIG. 2, in place of dedicated IoT Gateways 102, 112, 122, there is a transient IoT Gateway 202 which could be owned by Enterprise A 200, Enterprise B 210, some other enterprise, e.g., Enterprise n or, IoT Cloud 230 provided. Although FIG. 2 showcases APACHE OPEN WHISK as the serverless architecture, it could make use of any event-driven framework.

In this example, Enterprise A 200 includes the transient gateway 202, which communicates with devices 204. The devices 214 in Enterprise B 210 can communicate with transient gateway 202 and non-transient gateway 212 located outside the Enterprise B 210. The gateway 202 can communicated with applications 240, 242, 244 via the IoT cloud 230.

The main reason a gateway is called a Transient Gateway 202 is that whenever the main Gateway gets overloaded or when it needs to communicate over a protocol which it is incapable of handling, it makes one of the devices (that can communicate over the protocol) an IoT Gateway. This transformation could last for as less as just 1 event, making it very short-running gateway.

Also, the same gateway is used across different organizations and that is why it is called a shareable gateway.

Figure 3:
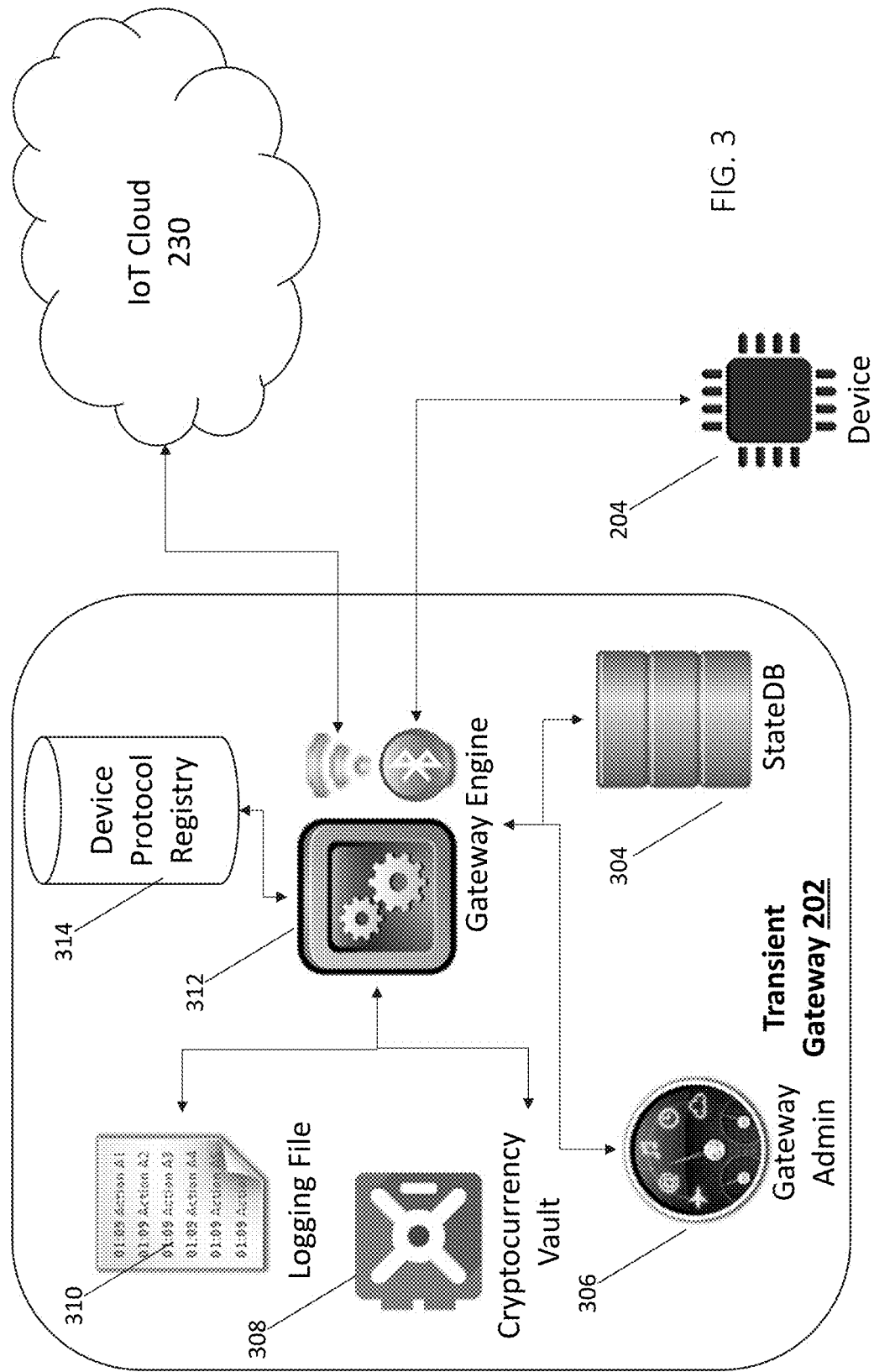
FIG. 3 shows one embodiment of an example transient Gateway component diagram.

FIG. 3 illustrates the components of a Transient Gateway 202. The components of Transient Gateway 202 can include a Gateway Engine 312, a Device and Protocol Registry 314, a Logging Mechanism, such as a Logging file 310, a Cryptocurrency vault 308, a Gateway Admin 306, and a State database (DB) 304. The Transient Gateway 202 communicates with the IoT Cloud 230 and the IoT device 204 via the Gateway Engine 312.

The Gateway engine 312 is described as follows. The Gateway engine 312 acts as the overall orchestrator of the Transient Gateway 202. The Gateway Engine 312 has the following functionalities. The Gateway Engine 312 keeps listening to StateDB (State Database) 304 for the bandwidth utilization in all the permanent 222 and transient gateways 202 for load balancing.

In case a new request arrives from Gateway Admin 306, the Gateway Engine 312 updates the Device and Protocol Registry 314 and the State Database 304. The Gateway engine 312 keeps track of the cryptocurrency vault 308 and informs the Gateway admin 306 in case the amount in the currency drops below a certain threshold. The Gateway engine 312 also provides connectivity to multiple IoT Clouds 230.

The device and protocol registry 314 is described as follows. This device and protocol registry 314 acts as a master data for various devices, gateways, protocols and organizations involved in the interaction and consists of: (a) Multiple Organizations involved in the interaction, along with their admin; (b) Multiple Devices belonging to the organizations and involved in the interaction; (c) South-side (with localized applications) Multiple Protocols supported by the devices—outbound, inbound, outbound bandwidth, inbound bandwidth; (d) North-side (with Cloud Platform) Multiple Protocols supported by the devices—outbound, inbound, outbound bandwidth and inbound bandwidth; and (e) Protocol to interact with the Gateway(s)—outbound, inbound, outbound bandwidth and inbound bandwidth.

This device and protocol registry 314 could be in the form of a file, graphDB (graph database) or hardware device. As an example, a file-based Device and Protocol Registry 314 can be in YAML format, JSON, XML, flat file, etc.

In the registry 314 various organizations can be included, where for instance the organizations are defined at the highest level. Within an organization, protocol registry 314 can include the admin, devices and ad, where admin contains list of administrators, devices contains list of devices and ad contains the Access Control List.

In the registry 314 a given device can be its name and whether it can act as a gateway, long description, location, cloud connectivity endpoints, multiple protocols that it supports, as well as, physical quantity that it measures.

For example, in the device and protocol registry 314, there can be a device that cannot acts as a transient gateway. It measures temperature in dual units of measurement with upper limit set as 100 degrees centigrade, −20 as lower limit and accuracy of 1 degree Celsius.

In the device and protocol registry 314, similarly consider a hybrid pressure sensor, which can act as a gateway. It provides the range for both the southside protocol (wherein it interacts with all the devices which cannot connect using TCP/IP) as well as northside protocol (wherein it itself connects to another gateway, either permanent or transient). Device and protocol registry 314 can include a list of Access Control Lists, wherein various organizations and devices which can access using the gateway in this ACL are provided.

Security in the transient gateways 202 is handled as follows. Certain amount of trustworthiness is needed on both the parties, when they are engaged in using Transient Gateways 202. Having said that, Transient gateways 202 does provide security for both an Organizations providing its gateway for service, as well as, Organizations making use of the gateway.

Organizations providing its gateway for service is as follows. Security is needed in this case to prevent any rogue device from making use of the gateway 202 to send messages on its behalf. This is ensured by making use of the ACL which has accessor and disallow fields. In each of the fields, one can have Organization level, Device level, and even Message level restrictions.

Organization level access means every event-type of every device 204 is either allowed or denied delivery. Device level access means every event-type of a given device 204 is either allowed or denied delivery. Message level access is the finest form of access and means only a given event-type of a given device 204 is delivered.

Organizations making use of the gateway 202 is as follows. To handle the issues arising from sending a message from a transient gateway 202, the device 204 sending events to the transient gateway does two things: (1) Encrypts the message and (2) signs it to create a message digest. Thus even when the transient gateway 202 receives the message, it cannot decipher it thus preventing man-in-the-middle attack.

In case, the device 204 is incapable of encrypting and signing the message (in case of constrained devices) or in case the message itself is not so critical as to encrypt and sign it, it is sent with token ID. This token ID could be a one-time token ID or meant for certain number of transactions. In such a scenario, the gateway 202 would be able to read the message, but will either not be able to add its own message or in case it does add, the number of messages which can be sent using the token would get exhausted earlier than expected, again sending an alert to the organization.

Figure 4:
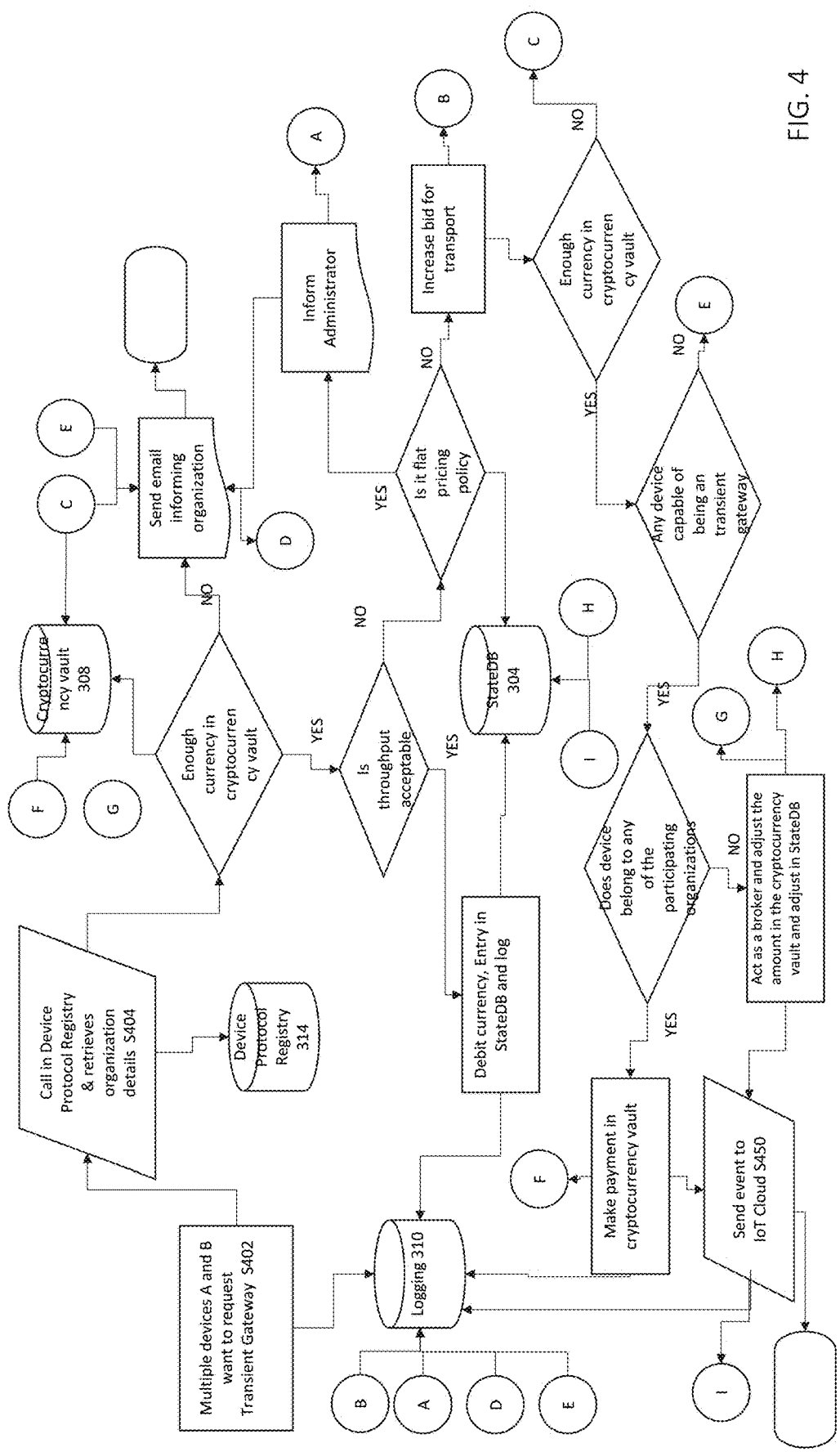
FIG. 4 illustrates one embodiment of an example gateway with no protocol sharing needed.

FIG. 4 illustrates a gateway with no protocol sharing needed. In this case, multiple devices A and B want to send events to the IoT Cloud S402. Each of the device makes a call to the Transient Gateway 202 and the Gateway engine 312 performs the activities shown in FIG. 4. The Gateway engine 312 Calls in Device Protocol Registry 314 & retrieves organization details S404. The Gateway engine 312 keeps track of the cryptocurrency vault 308 and informs the Gateway admin 306 in case the amount in the currency drops below a certain threshold. The Gateway engine 312 also provides connectivity to multiple IoT Clouds 230 in S450. In case a new request arrives from Gateway Admin 306, update the Device and Protocol Registry 314 and StateDB 304.

Figure 5:
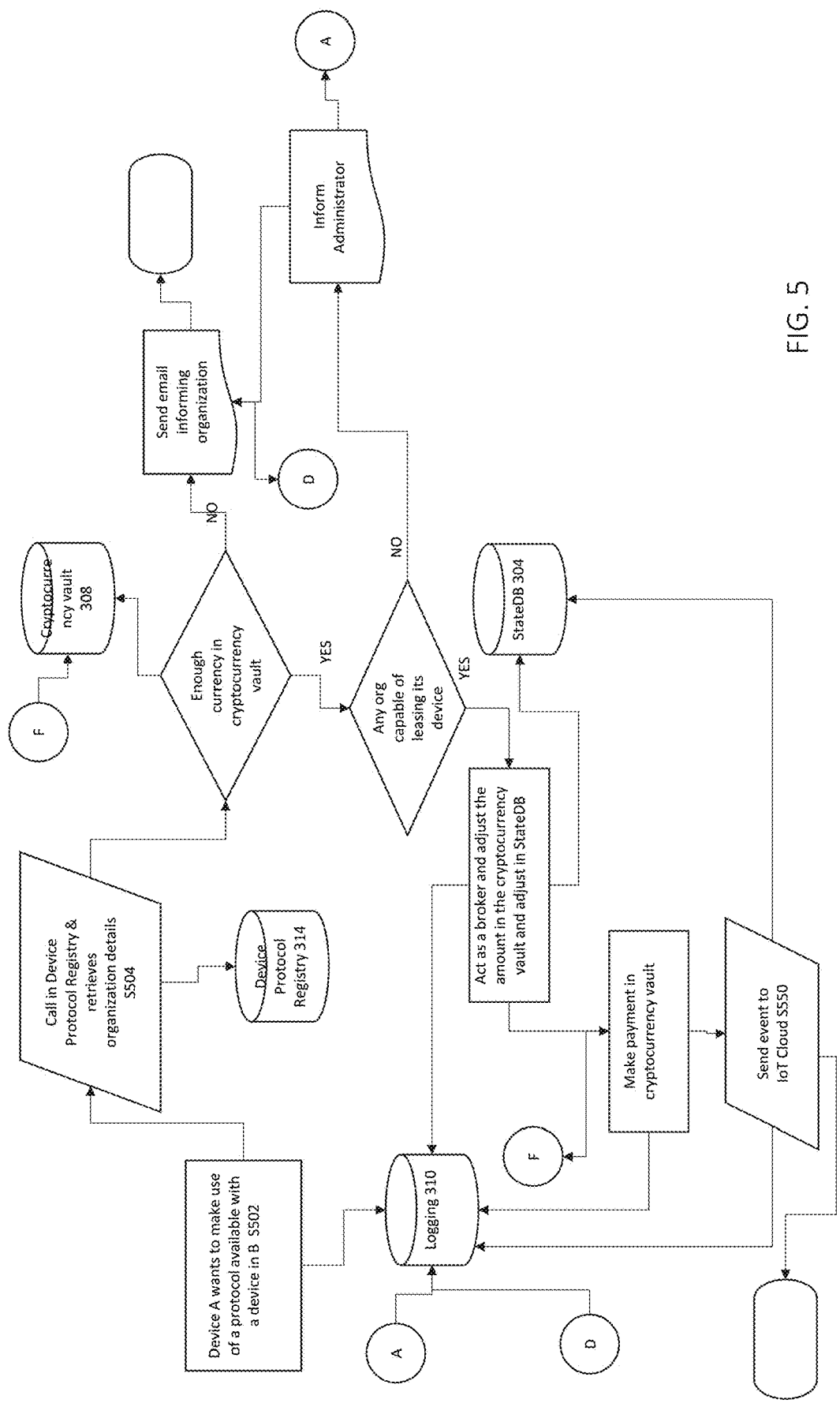
FIG. 5 illustrates one embodiment of an example gateway with sharing needed.

FIG. 5 illustrates a gateway with sharing needed. In this case, multiple devices A and B want to send events to the IoT Cloud S502. Each of the device makes a call to the Transient Gateway 202 and the Gateway engine 312 performs the activities shown in FIG. 5. The Gateway engine 312 Calls in Device Protocol Registry 314 & retrieves organization details S504. The Gateway engine 312 keeps track of the cryptocurrency vault 308 and informs the Gateway admin 306 in case the amount in the currency drops below a certain threshold. The Gateway engine 312 also provides connectivity to multiple IoT Clouds 230 in S450. In case a new request arrives from Gateway Admin 306, update the Device and Protocol Registry 314 and StateDB 304.

Therefore, as shown above, the transient gateway 202 gets instantiated whenever the throughput needed at one location exceeds the maximum possible throughput that could be achieved at that location while still maintaining it below the maximum assured one. Thus, the transient gateway 202 attempts to provide a certain minimal assured throughput. The transient gateway 202 is a 'shared' gateway across various organizations and every device which need to make use of it, would need to pay, in the form of cryptocurrency (or other modes of payment).

Figure 6:
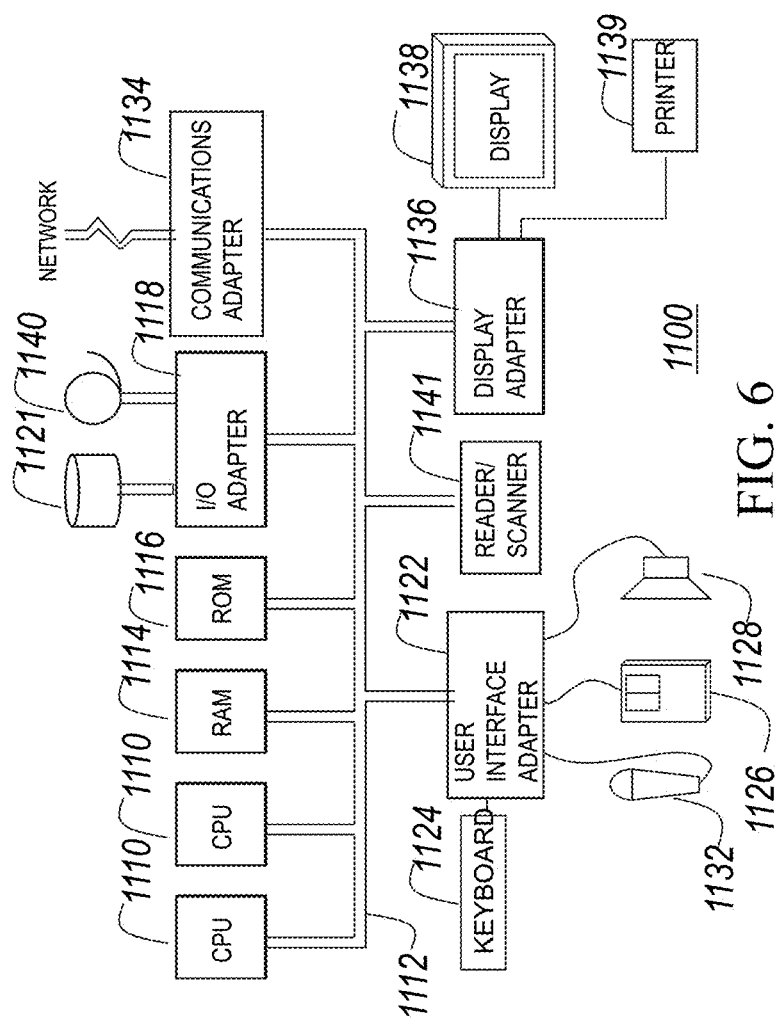
FIG. 6 illustrates one embodiment of an example hardware/information handling system.

FIG. 6 illustrates another hardware configuration of an information handling/computer system 1100 in accordance with the present invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Figure 7:
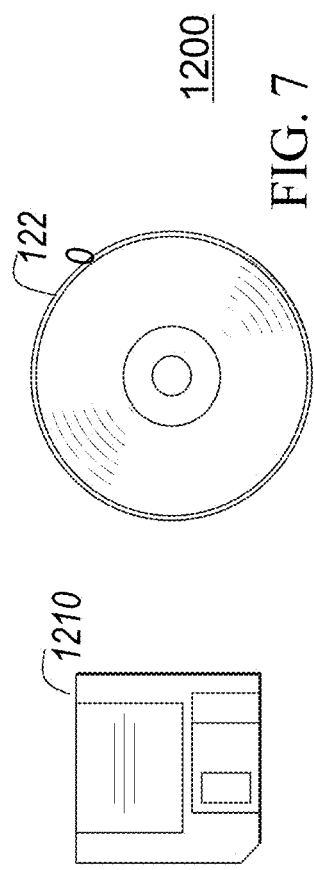
FIG. 7 illustrates embodiments of example signal-bearing storage media for storing machine-readable instructions.

Alternatively, the instructions may be contained in another signal-bearing storage media 1200, such as a magnetic data storage diskette 1210 or optical storage diskette 1220 (FIG. 7), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
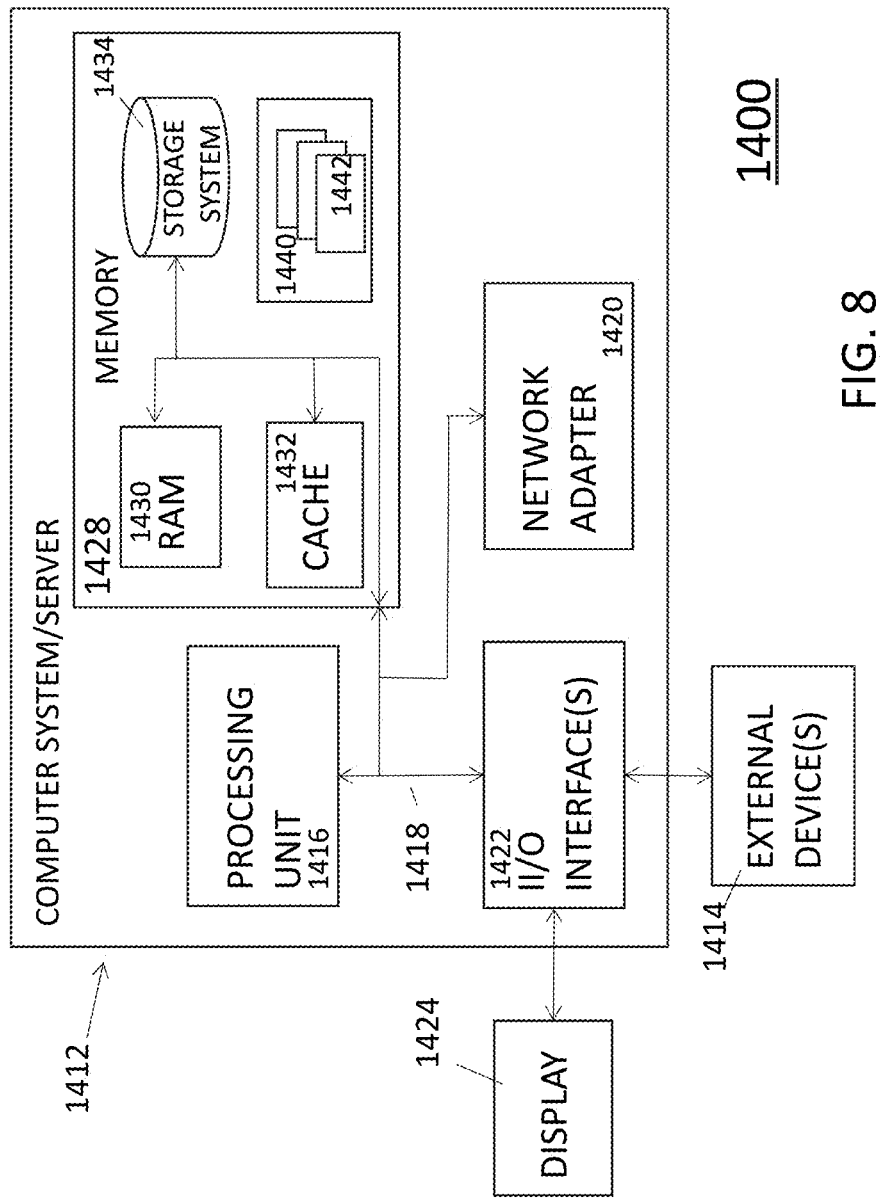
FIG. 8 depicts a cloud computing node according to an embodiment of the present invention.

Referring now to FIG. 8, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via input/output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 9:
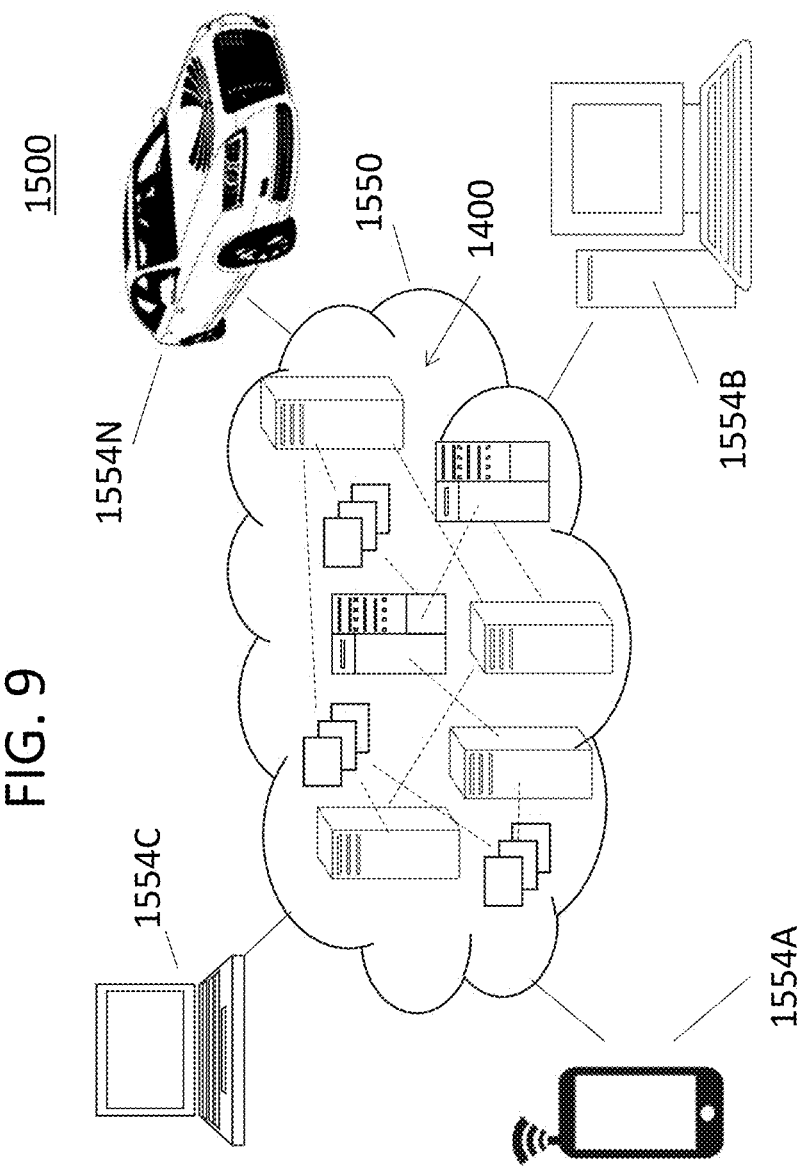
FIG. 9 depicts a cloud computing environment according to an embodiment of the present invention.

Referring now to FIG. 9, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 9 are intended to be illustrative only and that computing nodes 1400 and cloud computing environment 1550 can communicate with any type of computerized device over any type of network and/or network addressable connection (e.g., using a web browser).

Figure 10:
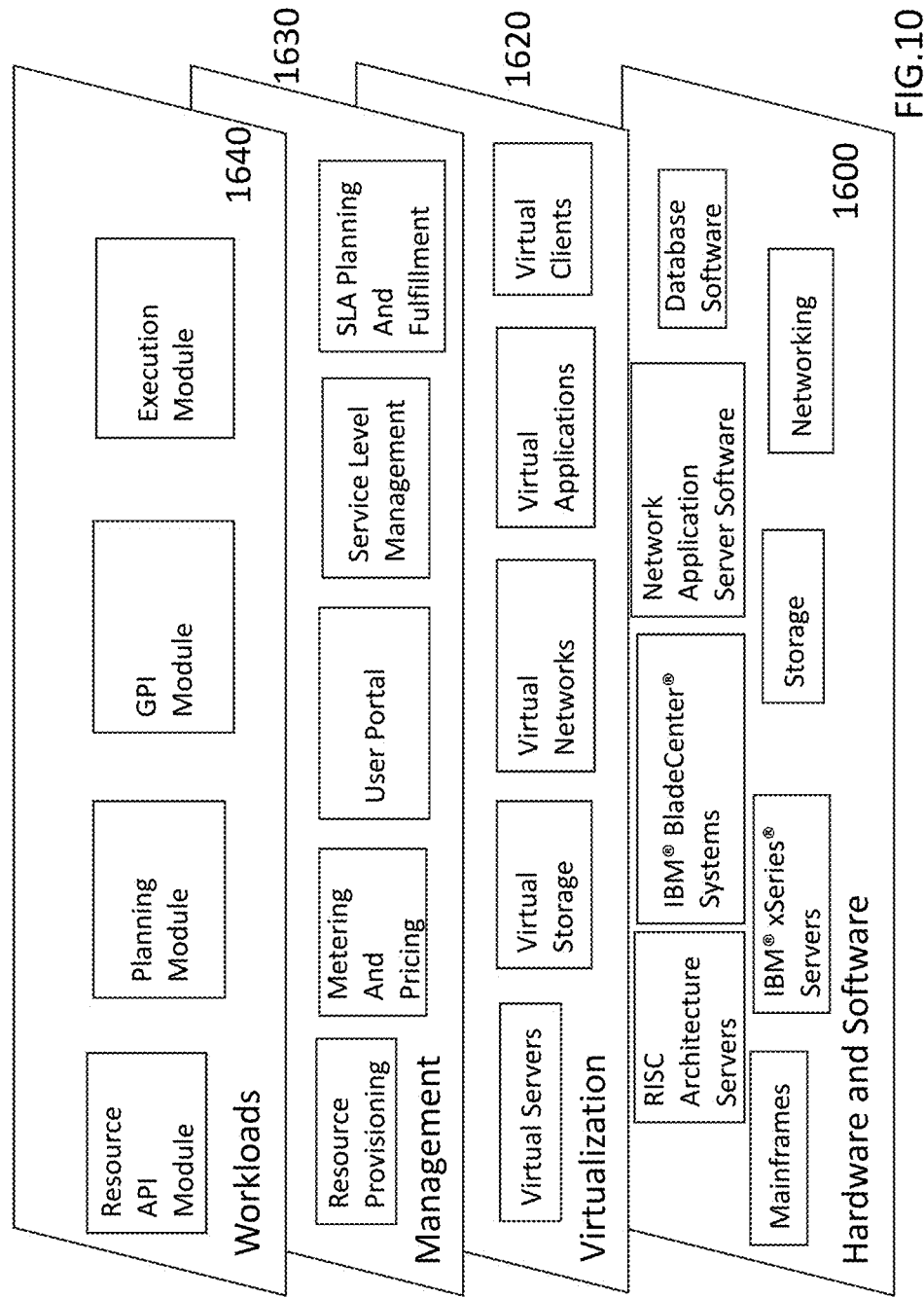
FIG. 10 depicts abstraction model layers according to an embodiment of the present invention.

Referring now to FIG. 10, a set of functional abstraction layers provided by cloud computing environment 1550 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM p Series® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A transient gateway, comprising:
    a storage device storing a set of data; and
    a gateway engine comprising software coupled to the storage device accessing and updating the set of data, the gateway engine being configured to share bandwidth and resources, across a plurality of organizations and devices,
    wherein the gateway engine at least calls in a device protocol registry and retrieves organization details of the plurality of organizations and devices to provide connectivity and organizes the set of data, and
    wherein the gateway engine organizes the set of data to act as a broker amongst the plurality of organizations and the gateway engine tracks a vault informing a gateway administrator when a value in the vault is below a threshold and the gateway engine provides connectivity to a plurality of clouds, and when a new request arrives from the gateway administrator, the gateway engine updates the device and protocol registry.

2. The transient gateway according to claim 1,
    wherein the storage device includes a device and protocol registry configured to be a master data for a plurality of devices, gateways, protocols and organizations with security restrictions,
    wherein the gateway engine tracks a cryptocurrency vault and informs a gateway admin when a value in the cryptocurrency vault is below a threshold, and
    wherein the gateway engine provides connectivity to multiple IoT (Internet of Things) clouds, and when new request arrives from the gateway admin, the gateway engine updates the device and protocol Registry and a state database.

3. The transient gateway according to claim 1, wherein the gateway engine provides protocols handling capabilities of its connected devices of one organization to another organization from among the plurality of organizations,
    wherein the gateway engine organizes the set of data to act as a broker amongst the plurality of organizations,
    wherein the storage device includes a device and protocol registry configured to be a main data for a plurality devices, gateways, protocols and organizations with security restrictions, and
    wherein the gateway engine organizes the set of data to provide a shared gateway amongst the plurality of organizations.

4. The transient gateway according to claim 1, wherein the storage device includes a device and protocol registry that stores and updates the set of data for various devices, other gateways, protocols and organizations,
    wherein the gateway engine tracks a cryptocurrency vault and informs a gateway admin when a value in the cryptocurrency vault is below a threshold, and
    wherein the gateway engine is configured to provide shared resources to the plurality of organizations and devices as a broker.

5. The transient gateway according to claim 1, wherein the gateway engine listens to the storage device for the bandwidth utilization in all the permanent and transient gateways for load balancing,
    wherein the gateway engine, when a new request arrives from a gateway administrator, update the storage device,
    wherein the transient gateway tracks a cryptocurrency vault and inform an administrator in case the amount in the currency drops below a certain threshold, and
    wherein the gateway engine is configured to provide shared resources to the plurality of organizations and devices via a controlled exchange of value.

6. The transient gateway according to claim 1, wherein the gateway engine is configured to connect IoT (Internet of Things) devices to an IoT cloud,
- wherein the bandwidth and resources are shared across the plurality of organizations, and provides connectivity to a plurality of the IoT clouds, and
- wherein the gateway engine provides connectivity to a plurality of clouds, and when new request arrives from the gateway administrator, the gateway engine updates the device and protocol registry.

7. The transient gateway according to claim 1, wherein the gateway engine is configured in the clouds,
- wherein the gateway engine organizes the set of data to act as a broker amongst the plurality of organizations,
- wherein the storage device includes a device and protocol registry configured to be a master data for a plurality devices, gateways, protocols and organizations with security restrictions,
- wherein the gateway engine tracks a cryptocurrency vault and informs a gateway admin when a value in the cryptocurrency vault is below a threshold,
- wherein the gateway engine provides connectivity to multiple IoT (Internet of Things) clouds, and when new request arrives from the gateway admin, the gateway engine updates the device and protocol Registry and a state database,
- wherein the gateway engine listens to the storage device for the bandwidth utilization in all the permanent and transient gateways for load balancing,
- wherein the gateway engine, when a new request arrives from a gateway administrator, update the storage device, and
- wherein the transient gateway tracks a cryptocurrency vault and inform an administrator in case the amount in the currency drops below a certain threshold.

8. A method of a transient gateway, the method comprising:
- storing a set of data;
- accessing and updating the set of data to share bandwidth and resources, across a plurality of organizations and devices; and
- calling at least in a device protocol registry and retrieving organization details of the plurality of organizations and devices and tracking a vault informing a gateway administrator when a value in the vault is below a threshold and the gateway engine provides connectivity to a plurality of clouds, and when a new request arrives from the gateway administrator, updating the device and the protocol registry.

9. The method according to claim 8, further comprising of organizing the set of data to act as a broker amongst the plurality of organizations,
- wherein a storage device includes a device and protocol registry configured to be a master data for a plurality devices, gateways, protocols and organizations with security restrictions, and
- wherein the gateway engine organizes the set of data to provide a shared gateway amongst the plurality of organizations.

10. The method according to claim 8, further comprising of providing resources as a monetized commodity,
- wherein the gateway engine organizes the set of data to act as a broker amongst the plurality of organizations, and
- wherein the gateway engine listens to the storage device for the bandwidth utilization in all the permanent and transient gateways for load balancing.

11. The method according to claim 8, further comprising of providing protocol handling capabilities of its connected devices of one organization to another organization from among the plurality of organizations.

12. The method according to claim 8, further comprising of storing and updating the set of data for various devices, other gateways, protocols and organizations.

13. The method according to claim 8, further comprising:
- listening to a storage device for the bandwidth utilization in all the permanent and transient gateways for load balancing;
- when a new request arrives from a gateway administrator, updating the storage device; and
- tracking a cryptocurrency vault and inform an administrator in case the amount in the currency drops below a certain threshold.

14. The method according to claim 8, further comprising connecting IoT (Internet of Things) devices to a plurality of IoT cloud.

15. A computer program product comprising a computer readable storage medium having program instructions embodied therewith, the program instructions readable and executable by a computer to cause the computer to perform a method, comprising:
- storing a set of data; and
- accessing and updating the set of data to share bandwidth and resources by a gateway engine, across a plurality of organizations,
- wherein the gateway engine at least calls in a device protocol registry and retrieves organization details of the plurality of organizations and tracking a vault informing a gateway administrator when a value in the vault is below a threshold and the gateway engine provides connectivity to a plurality of clouds, and when a new request arrives from the gateway administrator, updating the device and the protocol registry.

16. The computer program product according to claim 15, further comprising of organizing the set of data to act as a broker amongst the plurality of organizations,
- wherein the computer readable storage medium includes a device and protocol registry configured to be a master data for a plurality devices, gateways, protocols and organizations with security restrictions,
- wherein the gateway engine organizes the set of data to provide a shared gateway amongst the plurality of organizations.

17. The computer program product according to claim 15, further comprising of providing resources as a monetized commodity,
- wherein the gateway engine organizes the set of data to act as a broker amongst the plurality of organizations.

18. The computer program product according to claim 15, further comprising of providing protocol handling capabilities of its connected devices of one organization to another organization from among the plurality of organizations.

19. The computer program product according to claim 15, further comprising:
- storing and updating the set of data for various devices, other gateways, protocols and organizations;
- listening to a storage device for the bandwidth utilization in all the permanent and transient gateways for load balancing;
- when a new request arrives from a gateway administrator, updating the storage device;
- tracking a cryptocurrency vault and inform an administrator in case the amount in the currency drops below a certain threshold; and connecting IoT (Internet of Things) devices to a plurality of IoT cloud.

\* \* \* \* \*